(12) United States Patent
Takeichi et al.

(10) Patent No.: US 11,887,214 B2
(45) Date of Patent: Jan. 30, 2024

(54) STORAGE MEDIUM STORING PROGRAM FOR GENERATING ALBUM DATA, IMAGE PROCESSING METHOD FOR GENERATING ALBUM DATA, AND IMAGE PROCESSING APPARATUS FOR GENERATING ALBUM DATA

(71) Applicant: CANON KABUSHIKI KAISHA, Tokyo (JP)

(72) Inventors: Jumpei Takeichi, Tokyo (JP); Hiroyasu Kunieda, Tokyo (JP); Takayuki Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 414 days.

(21) Appl. No.: 17/191,762

(22) Filed: Mar. 4, 2021

(65) Prior Publication Data
US 2021/0287411 A1 Sep. 16, 2021

(30) Foreign Application Priority Data
Mar. 16, 2020 (JP) .................. 2020-045629

(51) Int. Cl.
| | |
|---|---|
| G06T 11/00 | (2006.01) |
| G06T 11/60 | (2006.01) |
| G06F 18/22 | (2023.01) |
| G06V 10/74 | (2022.01) |

(52) U.S. Cl.
CPC .............. *G06T 11/00* (2013.01); *G06F 18/22* (2023.01); *G06T 11/60* (2013.01); *G06V 10/761* (2022.01); *G06T 2200/24* (2013.01)

(58) Field of Classification Search
CPC ..... G06T 11/00; G06T 11/60; G06T 2200/24; G06F 18/22; G06V 10/761
See application file for complete search history.

(56) References Cited

U.S. PATENT DOCUMENTS

| | | | |
|---|---|---|---|
| 2005/0134947 A1* | 6/2005 | Tsue ................... | H04N 1/00167 358/1.9 |
| 2018/0146105 A1* | 5/2018 | Saito .................. | H04N 1/00461 |
| 2020/0012877 A1 | 1/2020 | Kotake et al. | |
| 2020/0363947 A1* | 11/2020 | Ikuta ..................... | G06F 3/0488 |
| 2021/0203791 A1* | 7/2021 | Noguchi ............ | H04N 1/00196 |

FOREIGN PATENT DOCUMENTS

JP 2019-215593 A 12/2019

* cited by examiner

*Primary Examiner* — Edward F Urban
*Assistant Examiner* — Wassim Mahrouka
(74) *Attorney, Agent, or Firm* — Carter, DeLuca & Farrell LLP

(57) ABSTRACT

An object of the present disclosure is to reduce the number of pages while guaranteeing the consistency of the story of an album. One embodiment of the present invention is a non-transitory computer readable storage medium storing a program for causing a computer to function as: a selection unit configured to select, based on analysis results of each of a plurality of model images used in a model album and analysis results of each image in a candidate image group that is used in an album, similar images similar to the model images from among the candidate image group; a creation unit configured to create a layout in which the similar images selected by the selection unit are arranged in templates of the model album; and a reducing unit configured to reduce a number of pages of the layout.

16 Claims, 14 Drawing Sheets

FIG.3A

| NUMBER OF PAGES | SIZE (W) | SIZE (H) | PAPER TYPE | BINDING PORTION |
|---|---|---|---|---|
| 20 | 150 | 150 | GLOSSY PAPER | PERFECT BINDING |

FIG.3B

| DOUBLE-PAGE SPREAD NUMBER | x | y | w | h | ANGLE | IMAGE PATH |
|---|---|---|---|---|---|---|
| 0 | 150 | 0 | 150 | 150 | 0 | image1.jpg |
| 1 | 10 | 10 | 130 | 130 | 0 | image12.jpg |
| 1 | 160 | 10 | 130 | 130 | 0 | image15.jpg |
| 2 | 10 | 10 | 130 | 60 | 0 | image19.jpg |
| 2 | 10 | 80 | 130 | 60 | 0 | image20.jpg |
| 2 | 16 | | | | | |
| ... | | | | | | |
| 10 | 0 | 0 | 300 | 150 | | image103.jpg |
| 10 | 20 | 60 | 60 | 80 | 10 | image5.jpg |

STORAGE MEDIUM STORING PROGRAM FOR GENERATING ALBUM DATA, IMAGE PROCESSING METHOD FOR GENERATING ALBUM DATA, AND IMAGE PROCESSING APPARATUS FOR GENERATING ALBUM DATA

BACKGROUND OF THE INVENTION

Field of the Invention

The present disclosure relates to a storage medium, an image processing method, and an image processing apparatus and more specifically, relates to a storage medium, an image processing method, and an image processing apparatus for creating an album.

Description of the Related Art

In recent years, due to the spread of smart devices and improvement of the camera performance of smart devices, in addition to the spread of digital cameras, the number of captured photos of users is increasing rapidly. Accompanying the increase in the number of captured photos, various variations of objects to be captured have increased in number.

Desired images are selected from among a large number of captured images and an album is created by using the selected images. However, it is a job that takes time and effort to select images from among a large number of captured images and determine an image output form, such as determining a layout and determining a template.

Japanese Patent Laid-Open No. 2019-215593 has disclosed a method of determining an output form of desired images among a plurality of newly captured images by using information on an image group that was input for previous album creation. The technique described in Japanese Patent Laid-Open No. 2019-215593 is a technique for creating an album whose type is fixed, such as a wedding album, and an album is created by arranging images obtained by capturing a fixed type ceremony, such as exchange of wedding rings, cake cutting, and speech, in the progress order. By the automatic album creation such as this, it is possible to automatically create an album with a favorable layout efficiently by preparing in advance an album that serves as a model (referred to as a model album) and selecting candidate images similar to the images used in the model album and automatically arranging them.

SUMMARY OF THE INVENTION

However, in a case where the number of pages of an album to be created, which is designated by a user, is smaller than the number of pages of a model album, on a condition that layout deletion for intermediate data that is created based on the model album is performed simply, there is a possibility that the consistency of the story of the album is lost.

Consequently, in view of the above-described problem, an object of one embodiment of the present invention is to delete a page while guaranteeing the consistency of the story of an album in a case where the number of pages of the album to be created is smaller than the number of pages of the model album.

One embodiment of the present invention is a non-transitory computer readable storage medium storing a program for causing a computer to function as: a selection unit configured to select, based on analysis results of each of a plurality of model images used in a model album and analysis results of each image in a candidate image group that is used in an album, similar images similar to the model images from among the candidate image group; a creation unit configured to create a layout in which the similar images selected by the selection unit are arranged in templates of the model album; a setting unit configured to set a priority order for each element configuring the layout in a case where a number of pages of an album to be created is smaller than a number of pages of the model album; and a reducing unit configured to reduce a number of pages of the layout in accordance with the priority order.

Further features of the present invention will become apparent from the following description of exemplary embodiments with reference to the attached drawings.

BRIEF DESCRIPTION OF THE DRAWINGS

FIG. 3A and FIG. 3B are each a diagram showing a structure of album data;

DESCRIPTION OF THE EMBODIMENTS

First Embodiment

In the present embodiment, in an image processing apparatus, an application for album creation (in the following, also referred to simply as "application") is caused to run and album data in which a plurality of photo images is laid out automatically is created on the application. Then, by performing printing based on the album data, one or a plurality of albums as printed materials is created. In the present embodiment, based on model album data, by using an image group different from the image group arranged in the model album data, album data similar to the model album data is created. To explain in more detail, album data is created which has the same number of pages as that of the model album data and in which an image similar to each model image arranged on each page of the model album data is arranged at the same position as that of the model image.

<About Hardware Configuration of Image Processing Apparatus>

In the following, the hardware configuration of an image processing apparatus in the present embodiment is explained by using FIG. 1. In the following, a case is explained where the image processing apparatus is an information processing apparatus (PC), but it may also be possible to adopt another apparatus, such as a smartphone, as the image processing apparatus.

Figure 1:
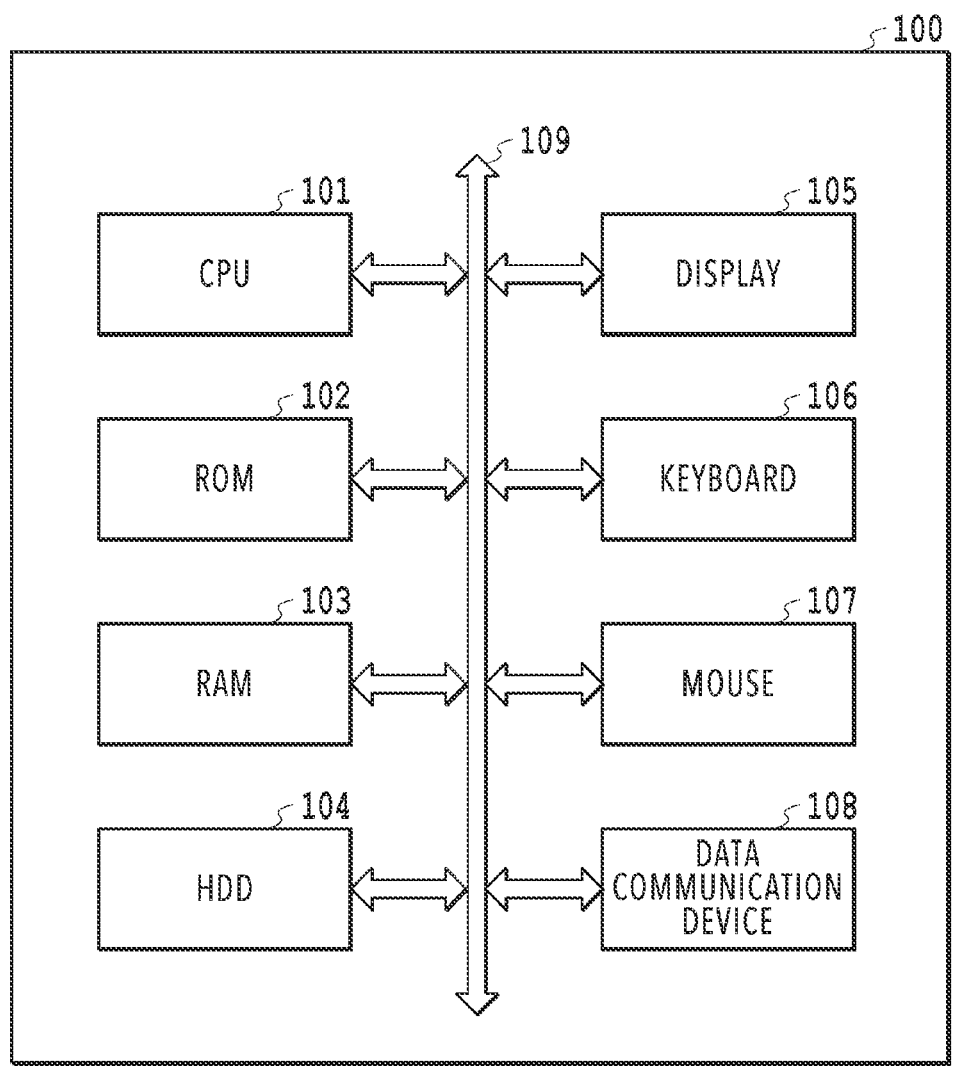
FIG. 1 is a block diagram showing a hardware configuration of an image processing apparatus.

As shown in FIG. 1, an image processing apparatus 100 has a CPU 101, a ROM 102, a RAM 103, an HDD 104, a display 105, a keyboard 106, a mouse 107, and a data communication device 108. These components are connected by a data bus 109 and capable of performing transmission or reception of data with one another.

The CPU 101 controls the entire image processing apparatus 100. Further, the CPU 101 performs an image processing method that is explained in the present embodiment in accordance with programs. In FIG. 1, the image processing apparatus has one CPU, but the image processing apparatus may have a plurality of CPUs.

In the ROM 102, programs that are executed by the CPU 101 are stored. The RAM 103 provides a memory for temporarily storing various kinds of information at the time of execution of the program by the CPU 101. In the HDD 104, a database or the like for storing image files and results of processing, such as image analysis, is stored and in the present embodiment, in this HDD 104, an application program for album creation is stored. This application program is sometimes called also album creation application and will be described later by using FIG. 5 and the like.

The display 105 is a device for presenting a graphical user interface (in the following, GUI) in the present embodiment and image layout results to a user by displaying them. The display 105 may have a touch sensor function. The keyboard 106 is one of input devices possessed by the image processing apparatus 100 and for example, used for inputting predetermined information onto the GUI displayed on the display 105. In the present embodiment, a user inputs the number of double-page spreads and the number of pages of an album via the keyboard 106. The mouse 107 is one of the input devices possessed by the image processing apparatus 100 and for example, used to click and press down a button on the GUI displayed on the display 105.

The data communication device 108 is a device for communicating with an external apparatus, such as a printer and a server. For example, album data, which is results of automatic layout, is transmitted to a printer and a server connected to the image processing apparatus 100 via the data communication device 108. The data bus 109 connects each of the components described above and the CPU 101. The above is the contents of the hardware configuration of the image processing apparatus in the present embodiment.
<About Software Configuration of Image Processing Apparatus>

In the following, the software configuration of the image processing apparatus in the present embodiment, in other words, the function configuration implemented by the album creation application installed in the image processing apparatus is explained by using FIG. 2. The album creation application activates by an icon of the application that is displayed on the display 105 being double-clicked by a user using the mouse 107. The album creation application has a variety of functions but in the following, an automatic layout function that is provided by an automatic layout processing unit 201, which is a particularly important function in the present embodiment, is explained mainly.

Figure 2:
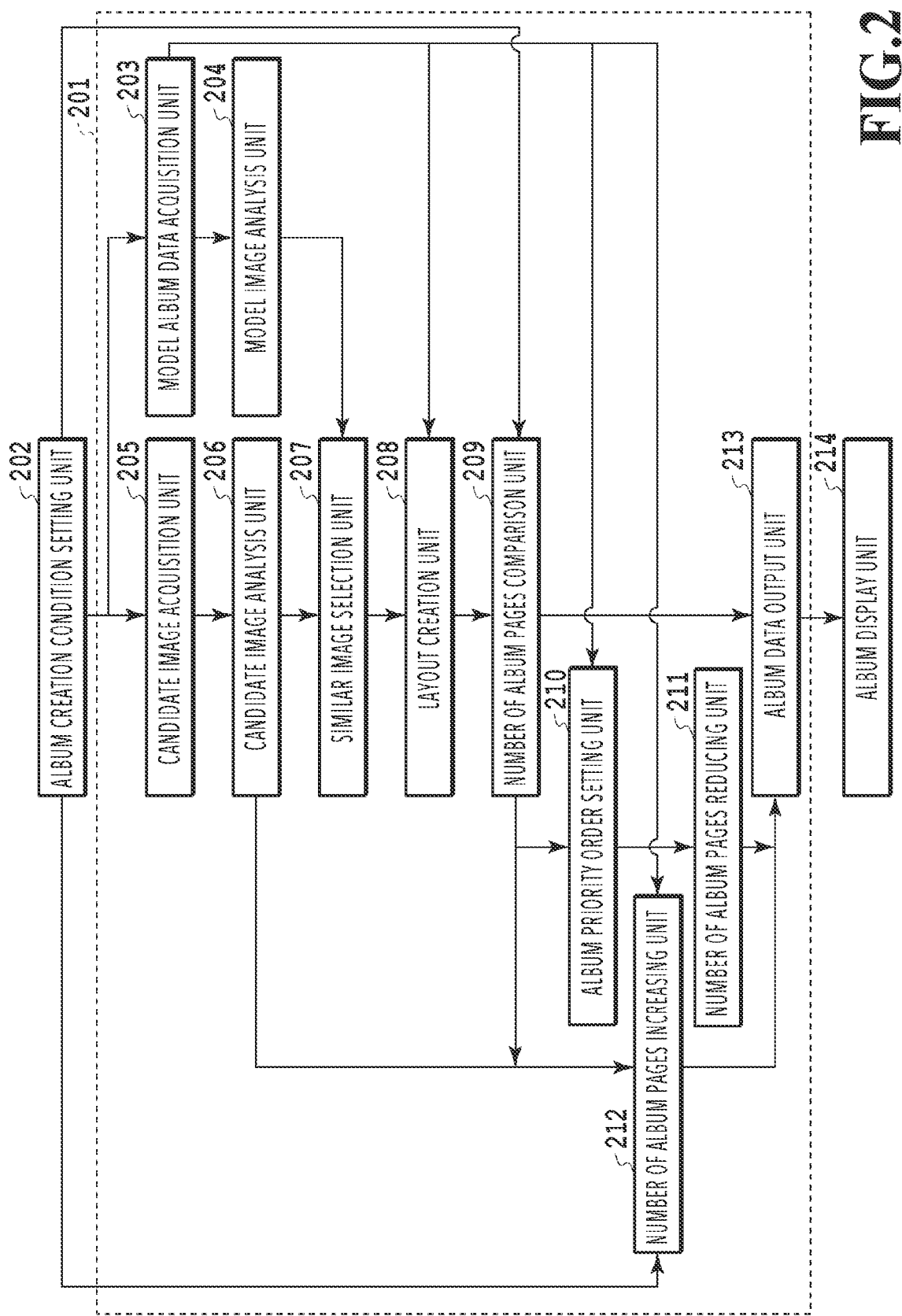
FIG. 2 is a block diagram showing a software configuration of the image processing apparatus.

As shown in FIG. 2, this application has an album creation condition setting unit 202, the automatic layout processing unit 201, and an album display unit 214. The "automatic layout function" is a function to create album data by laying out captured photo images after classifying and selecting them based on the contents and attributes thereof. The contents based on the created album data are displayed on the display 105.

The album creation condition setting unit 202 sets the album creation conditions in accordance with the mouse operation of a user to the automatic layout processing unit 201. In the present embodiment, as the album creation conditions, album data that serves as a model, an image group that is used in an album to be created newly, and an album commodity material are set. The setting of the model album data may be based on the structure of the file system in which the album data is saved, for example, such as designation of a file or a directory, or may be performed by selecting from among alternatives registered in advance as presets in the application. The setting of an image group may be performed by using attached information on individual piece of image data, for example, such as the image capturing date, and attribute information, or may be performed based on the structure of the file system in which image data is saved, such as designation of a device or a directory. Further, the commodity material refers to the kind of paper used for an album and processing of the binding portion at the time of bookbinding.

Here, an album to be created in the present embodiment is explained. In the present embodiment, the album includes a front cover and a plurality of double-page spreads. The "double-page spread" corresponds to, for example, one display window in display and in a printed material, corresponds to a pair of pages (that is, corresponds to two pages) adjacent to each other in a case where a book is opened. For two pages within a double-page spread, there a case where the double-page spread is formed by different sheets on which printing has been performed being bound so that the sheets are adjacent to each other and a case where the double-page spread is formed by one sheet on which printing has been performed being folded at the center. In the following, explanation is given by using the concept of double-page spread such as this, but the concept of page may also be accepted. In the present embodiment, based on the model album data that is set by the album creation condition setting unit 202 and the image group, the album data for creating an album similar to the model album is created.

The album data referred to here includes at least data of images that are arranged in the album and information on the number, the position, the size and the like of the double-page spread on which the images are arranged. Further, the album data may include information relating to the entire album, such as the kind of paper that is used at the time of album bookbinding, the bookbinding method, and the album size. Furthermore, it may also be possible for a user to set in advance the importance level for each photo, for each page, or for each double-page spread as the model album data and read the set data. The unit in which the importance level is set is not limited to this and for example, it may also be possible to set in a unit of scene.

FIG. 3A and FIG. 3B are each an example of the album data that is used in the present embodiment. FIG. 3A shows an example of a table (called commodity material table) storing information relating to the commodity material as information relating to the entire album. In the commodity material table, each value of the number of pages of the album, the sizes, the kind of paper on which printing is performed, and the bookbinding method is stored. FIG. 3B shows an example of a table (called slot table) storing information relating to images that are arranged on the paper surface, the positions thereof and the like. In the slot table, each value of the image that is arranged in the album, the double-page spread number, the position, the size, and the angle is stored in each row. Hereinafter, information corresponding to one row in the table in FIG. 3B is called slot information and the slot group belonging to the same double-page spread number in the model album data is collectively called template. The information that is included in the album data is not limited to the slot information such as this. Layer information indicating the display order in a case where images overlap, the trimming amount, the kind of effect, character information, figure information and the like may be included in the slot information.

Figure 4:
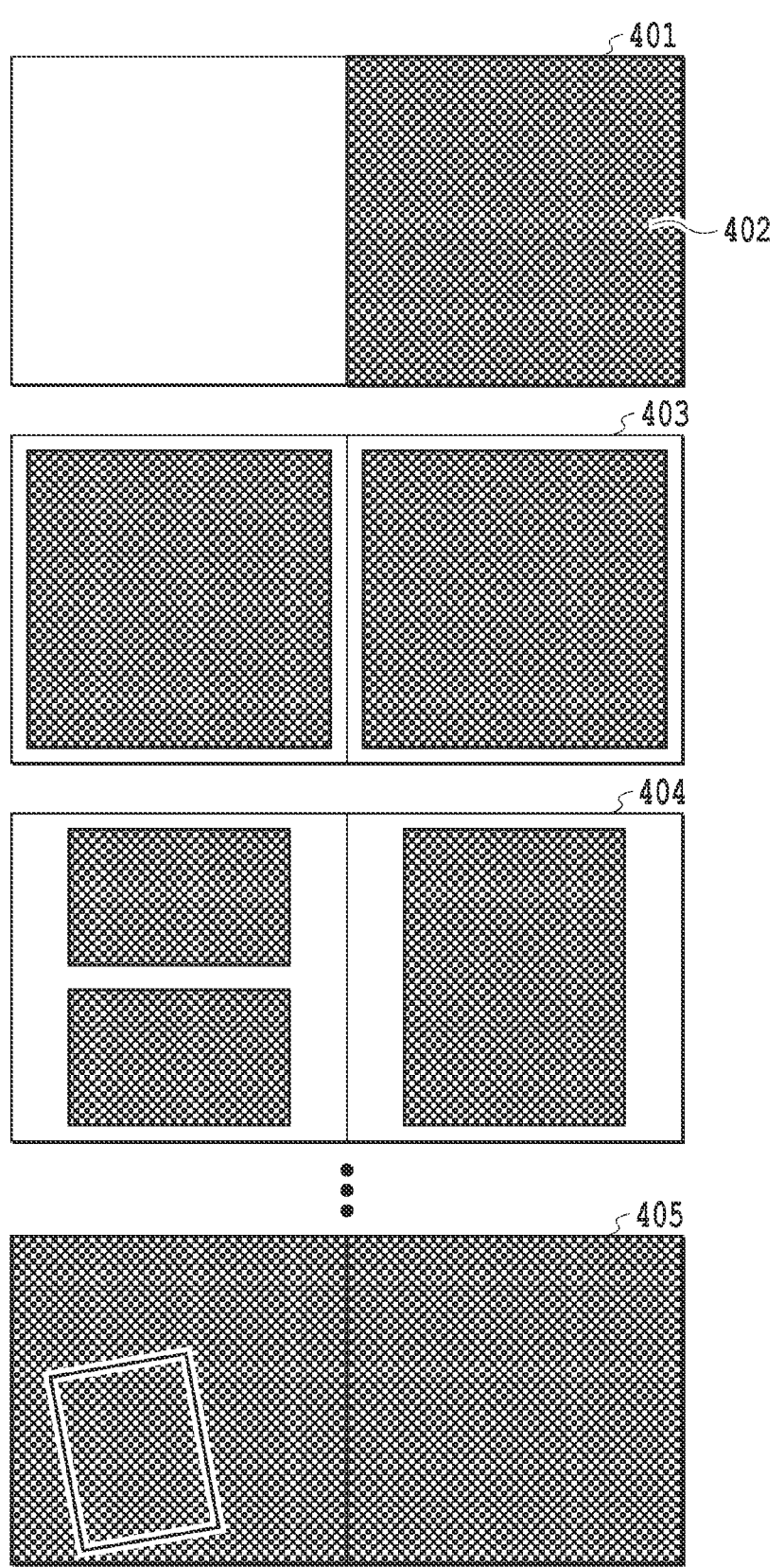
FIG. 4 is a diagram showing an album layout.

FIG. 4 shows layout results based on the album data in FIG. 3A and FIG. 3B. A front cover 401, a double-page spread 403, a double-page spread 404, and a double-page spread 405 are diagrams laid out based on the slot information on the double-page spread numbers 0, 1, 2, and 10 in FIG. 3B, respectively. The left side of the front cover 401 corresponds to the back cover and the right side corresponds to the front cover. The filled-in area in FIG. 4 represents the slot and the image data of the value stored in an image path field in FIG. 3B is arranged in this area. For example, in the slot 402, image1.jpg is arranged. In automatic layout processing, to be described later, album data is created in which images whose image features, such as the composition, the object, and the tint, are similar to those of the images arranged in the model album data are arranged at the same positions as those of the model album.

A model album data acquisition unit 203 acquires the model album data that is set by the album creation condition setting unit 202 from the album data saved in the HDD 104.

A model image analysis unit 204 analyzes an image group included in the album data acquired by the model album data acquisition unit 203. In the present embodiment, the feature quantity of an image is derived and within-image object determination, composition determination, face detection, expression recognition of a detected face, and personal recognition of a detected face are performed. Further, the model image analysis unit 204 acquires information on the image capturing date by referring to data (for example, Exif information) attached to the image data acquired from the HDD 104. Information that is obtained as a result of the model image analysis unit 204 analyzing image data is called "analysis information".

A candidate image acquisition unit 205 acquires an image group that satisfies the album creation conditions set by the album creation condition setting unit 202 from the images saved in the HDD 104. The image group referred to here refers to an image group that is the layout candidate at the time of album creation. For example, in a case where Jan. 1, _____ is designated as the image capturing date, all the images captured on Jan. 1, _____ correspond to the layout candidate image group. As the images saved in the HDD 104, mention is made of still images and images cut out from a moving image. The still image and the cutout image are those acquired from an image capturing device of a digital camera, a smart device, and the like. The image capturing device may be possessed by the image processing apparatus 100 or by an external apparatus of the image processing apparatus 100. In a case where the image capturing device is an external apparatus, the candidate image acquisition unit 205 acquires an image via the data communication device 108. Further, the still image and the cutout image may be images acquired from an external network or a server via the data communication device 108. As the image acquired from a network or a server, mention is made of a social networking image (in the following, SNS image). The CPU 101 analyzes the data attached to the image data for each image and finds the storage source from which the image is acquired by executing the OS program. However, it may also be possible to manage the source from which the image is acquired within the application by acquiring the image from SNS via the application. The image that the candidate image acquisition unit 205 acquires it not limited to those described above and may be another kind of image.

A candidate image analysis unit 206 analyzes the image data acquired by the candidate image acquisition unit 205. In the present embodiment, the feature quantity of an image is derived and within-image object determination, composition determination, face detection, expression recognition of a detected face, and personal recognition of a detected face are performed. Further, the candidate image analysis unit 206 acquires information on the image capturing date by referring to data (for example, Exif information) attached to the image data acquired from the HDD 104. Furthermore, the candidate image analysis unit 206 calculates an image score indicating whether the image is an image suitable to the album. As the image whose image score is high, mention is made of, for example, an image whose aesthetic characteristic is high, such as an image whose contrast is high and an image whose edge is sharp, and an image whose contents are good, such as an image in which the eyes are not winking and an image in which the object that is the main theme, such as a person and a building, is captured large.

A similar image selection unit 207 selects an image that is used for the album based on the analysis information on the model image analyzed by the model image analysis unit 204 and the analysis information on the candidate image analyzed by the candidate image analysis unit 206. The similar image selection unit 207 selects one or a plurality of similar images from among the candidate images for each model image. Similar images refer to images whose degree of similarity therebetween is higher than a predetermined value. As the degree of similarity, mention is made of, for example, the distance between the image feature quantity that is acquired by the analysis by the model image analysis unit 204 and the image feature quantity that is obtained by the analysis by the candidate image analysis unit 206 and it can be said that the shorter the distance, the higher the degree of similarity is. It may also be possible to use the personal recognition results analyzed by the candidate image analysis unit 206 and include the magnitude of the image score in the selection reference at the time of selecting similar images.

A layout creation unit 208 allocates a selected image to the model template based on the model album data acquired by the model album data acquisition unit 203 and the image selected by the similar image selection unit 207. In the present specification, data in which a selected image is allocated to the model template is sometimes called layout.

A number of album pages comparison unit 209 compares the number of pages of the album to be created, which is set by the album creation condition setting unit 202, and the number of pages of the model album, which is acquired by the model album data acquisition unit 203, and determines a magnitude relationship between these numbers of pages. Specifically, determination of whether these numbers of pages are the same, or the number of pages of the album to be created, which is set by the album creation condition setting unit 202, is smaller than or larger than the number of pages of the model album, which is acquired by the model album data acquisition unit 203, is performed.

An album priority order setting unit 210 sets a priority order that is used at the time of deleting a part of pages from already-laid-out pages created by the layout creation unit 208. The setting unit of this priority order may be page, double-page spread, or slot. As an example of a method of setting a priority order, mention is made of a setting method in accordance with the importance level. The importance level here may be the slot size or it may also be possible to set high the importance level for the slot whose image score is high, which is calculated by the candidate image analysis unit 206. Further, in a case where the importance level for the model album is set as the model album data, it may also be possible to read the importance level, or a user may set the importance level directly. In addition, it may also be possible to set the importance level so that the balance of the time axis is made better. Making the balance of the time axis better refers to putting the state close to a state where photos are distributed in an appropriate balance in a case where the photos whose image capturing times are close are deleted and the photos are arranged on the time axis. Further, it may also be possible to set the priority order by using a combination of the plurality of kinds of method described here. Furthermore, as another priority order setting method, the degree of similarity (degree of model reproducibility) may be used. This method is a method that uses the degree of similarity found by the similar image selection unit 207. As how to use the degree of similarity, it may also be possible to set a certain threshold value to the degree of similarity and use the degree of similarity as a cutoff criterion to determine whether or not to use a photo or a slot in accordance with the threshold value, or use the degree of similarity as the priority order as it is. Of course, it may also be possible to set the priority order by using the two concepts of the degree of similarity and the importance level. Here, it is assumed that the priority order is set in the unit of double-page spread by using the degree of similarity.

A number of album pages reducing unit 211 reduces the number of pages of the album down to the number of pages set by the album creation condition setting unit 202 in accordance with the priority order set by the album priority order setting unit 210. As a method of reducing the number of pages, in a case where the priority order is set for each slot, it may also be possible to perform deletion in the unit of slot in order from the lowest priority order. Further, it may also be possible to perform deletion in the unit of page in order from the lowest priority order, which is derived by finding the average, median, maximum value, or minimum value of the priority order for each slot in the unit of page. Furthermore, it may also be possible to perform the deletion such as this in the unit of double-page spread in place of the unit of page. In a case where deletion is performed in the unit of slot, the total number of pages is reduced by changing the size of the remaining slot, allocating the slot that has been used for the next page as an alternative slot of the deleted slot, and so on. As another number of pages reduction method, it may also be possible to reduce the number of pages without deleting a photo (that is, without reducing the number of photos) by reducing the slot size. In a case where this reduction method is adopted, page deletion is performed in accordance with the priority order as in the method described above. Further, in a case where the priority order is set in the unit of page, even though an attempt is made to perform deletion by using the unit of slot as the unit of deletion, the priority order is not determined uniquely, and therefore, deletion is performed in the unit of page or in the unit of double-page spread. Here, it is assumed that page deletion is performed in the unit of double-page spread.

A number of album pages increasing unit 212 increases the number of pages of the album up to the number of pages set by the album creation condition setting unit 202. As a page that is added, it may also be possible to add a page that is laid out with a scene of the model album and in which the number of similar images is large or with a scene in which the number of captured images is large or add a page that is laid out with a scene not adopted in the stage of the layout creation. Alternatively, it may also be possible to add a blank page. The "scene" referred to here means an aggregate (sub image group) of images grouped in accordance with the analysis information. For example, two images whose image capturing times are different but whose image capturing time difference is less than or equal to a predetermined threshold value are determined to be in the same scene, or two images whose image capturing times are different but the same person or background is captured are determined to be in the same scene.

An album data output unit 213 outputs the album data created by the layout creation unit 208, the number of album pages reducing unit 211, or the number of album pages increasing unit 212. Here, the album data that is output by the album data output unit 213 is data that puts together the layouts of all the double-page spreads corresponding to the number of pages set by the album creation condition setting unit 202.

The album display unit 214 creates an image of the album based on the album data output by the album data output unit 213 and displays it on the display 105. The image of the album is, for example, image data in the bitmap format in which each image is arranged in accordance with a predetermined layout.

In a case where the program of the album creation application in the present embodiment is installed in the image processing apparatus 100, an activation icon of this application is displayed on the top screen (desktop) of the OS (Operating System) that runs on the image processing apparatus 100. In a case where a user double-clicks the activation icon on the desktop displayed on the display 105 with the mouse 107, the program of the album creation application saved in the HDD 104 is loaded onto the RAM 103. Then, the program loaded onto the RAM 103 is executed by the CPU 101 and the album creation application activates. The above is the contents of the software configuration of the image processing apparatus in the present embodiment. The application may be in another aspect and for example, may be a Web application that displays a screen and the like within a browser that runs in the image processing apparatus 100.

<About GUI Screen>

Figure 5:
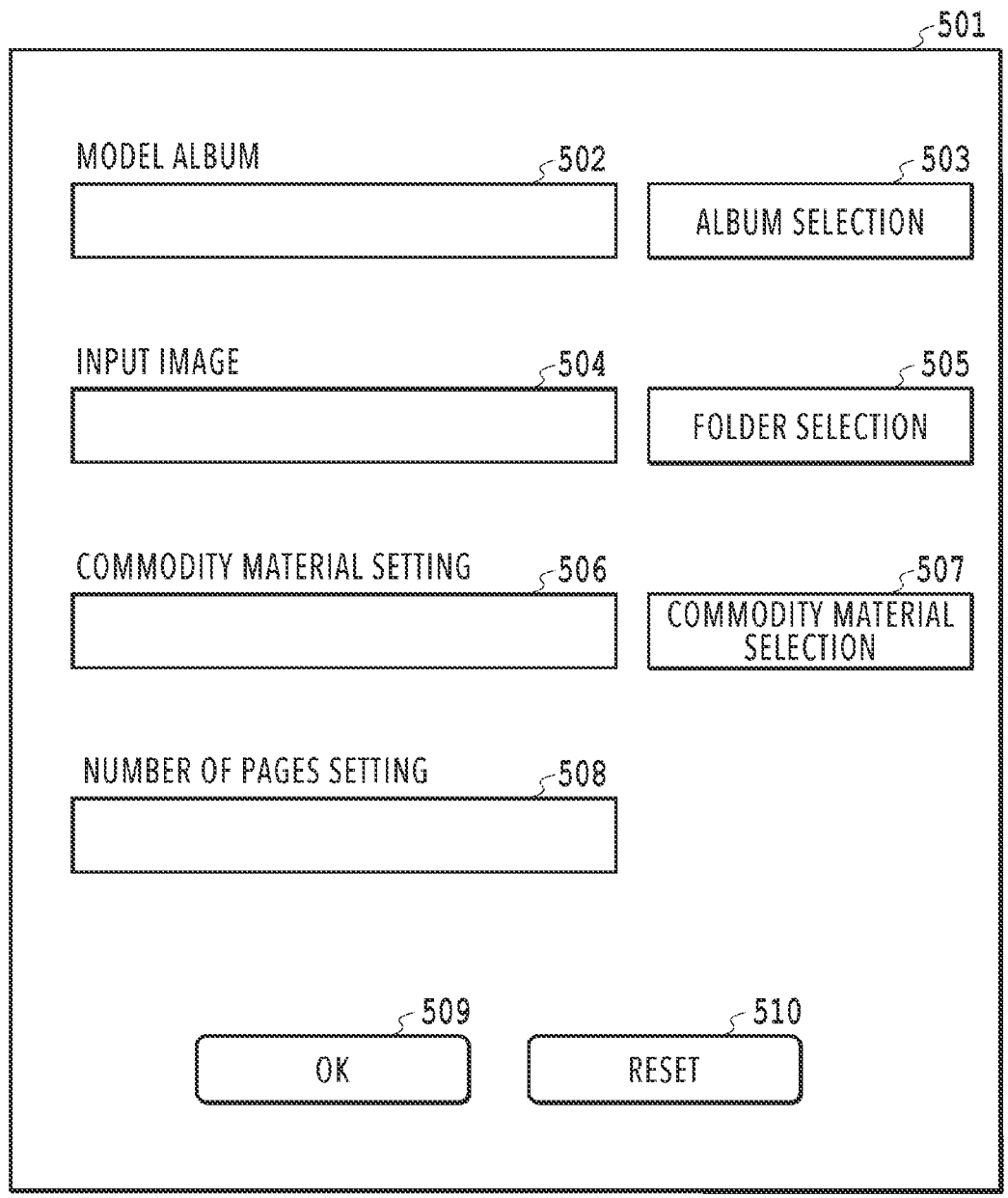
FIG. 5 is a diagram showing a GUI of an album creation application.

In the following, the GUI screen of the album creation application in the present embodiment is explained by using FIG. 5. FIG. 5 is a diagram showing a GUI screen 501 that is provided by the album creation application having activated and displayed on the display 105. It is possible for a user to set album creation conditions via the GUI screen 501.

The GUI screen 501 has a model album path box 502 and a model album data selection button 503 as model album data setting units (setting items). The model album path box 502 is a box for indicating the storage location (path) of the model album data saved in the HDD 104. The model album data selection button 503 is a button for selecting the model album data. In a case where a user clicks the model album data selection button 503 with the mouse 107, a tree including a plurality folders and files is displayed. In a case where a user selects a file storing the model album data, the file path of the selected file is displayed in the model album path box 502.

An input image path box 504 and an input image folder selection button 505 are setting units of a photo image that is included in the album. The input image path box 504 is a box for indicating the storage location (path) in the HDD 104 of an album creation-target image group. The input image folder selection button 505 is a button for selecting a folder including an album creation-target image group. In a case where a user clicks the input image folder selection button 505 with the mouse 107, a tree including a plurality of folders is displayed. Then, in a case where a user selects a folder including an album creation-target image group, the folder path of the selected folder is displayed in the input image path box 504.

A commodity material setting box 506 and a commodity material selection button 507 are commodity material setting units of the album to be created. The commodity material setting box 506 is a box for indicating commodity material information on the album to be created and in a case where model album data is selected by the model album data selection button 503, commodity material information on the model album data is displayed. The commodity material selection button 507 is a button for switching commodity materials. In a case where a user clicks the commodity material selection button 507 with the mouse 107, a list of commodity materials is displayed. Then, in a case where a user selects a commodity material, information on the selected commodity material is displayed in the commodity material setting box 506.

A number of pages setting input box 508 is a setting unit of the number of pages of an album to be created. As regards the number of pages setting input box 508, it may also be possible to enable a user to input a figure freely to this box or for a user to input a figure in a pull-down selection method by specifying in advance patterns of a plurality of numbers of pages. The setting results of the number of pages are displayed in the number of pages setting input box 508.

An OK button 509 is a button for determining selected conditions as album creation conditions. In a case where a user clicks the OK button 509 with the mouse 107, the album creation conditions are settled and the album creation conditions are transmitted to the automatic layout processing unit 201 via the album creation condition setting unit 202. To explain specifically, the path information that is input to the model album path box 502 is transmitted to the model album data acquisition unit 203. Further, the path information that is input to the input image path box 504 is transmitted to the candidate image acquisition unit 205. Furthermore, the commodity material information that is input to the commodity material setting box 506 is transmitted to the album data output unit 213.

A Reset button 510 is a button for resetting the contents of each setting on the display screen. The above is the contents of the GUI screen of the album creation application in the present embodiment.

<About Automatic Layout Processing>

Figure 6:
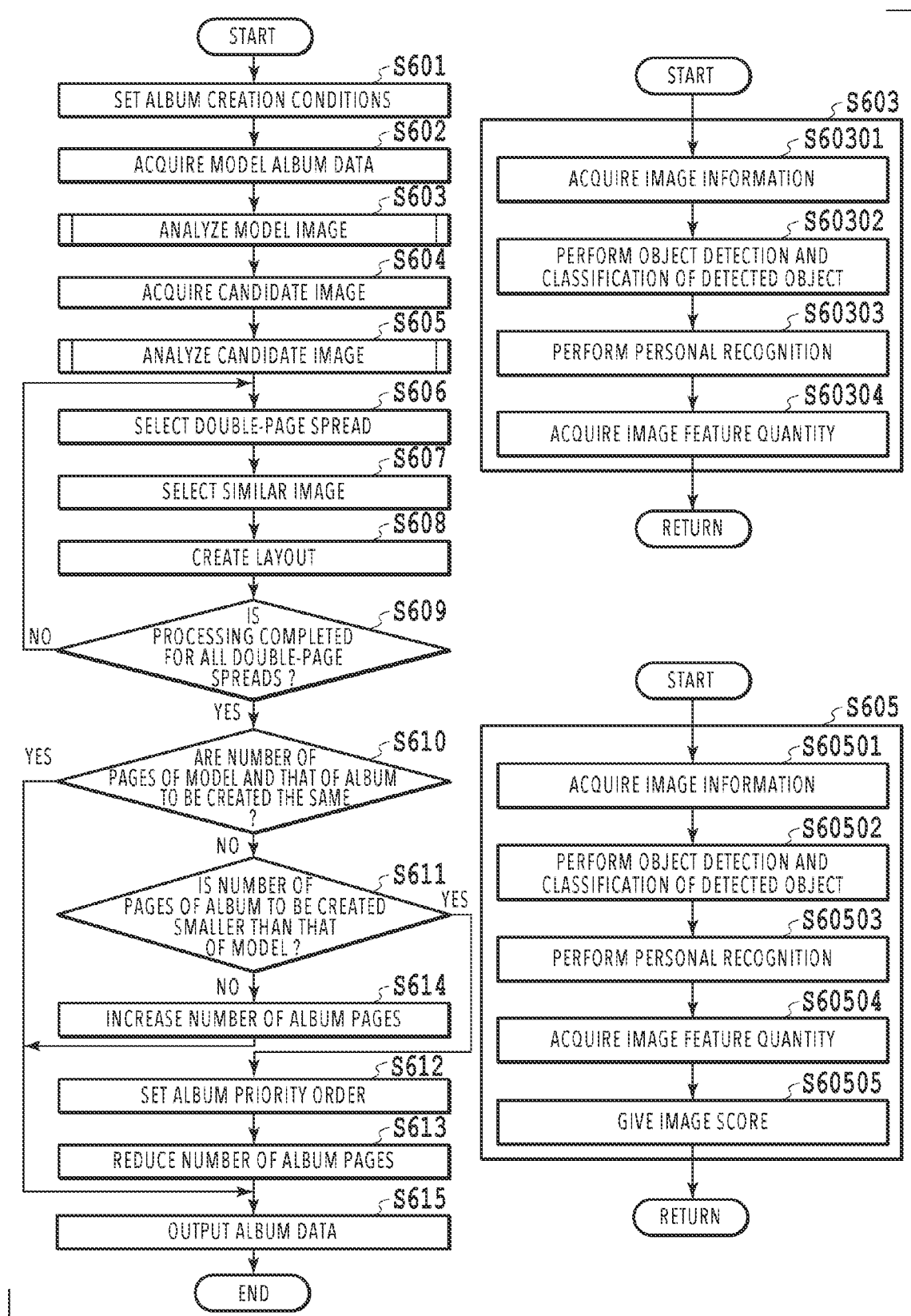
FIG. 6 is a flowchart of automatic layout processing.

In the following, the automatic layout processing in the present embodiment is explained by using FIG. 6. FIG. 6 is a flowchart of processing to perform the automatic layout of the album creation application in the present embodiment. The flowchart shown in FIG. 6 is implemented by, for example, the CPU 101 reading the program stored in the HDD 104 onto the ROM 102 or the RAM 103 and executing the program.

At step S601, the album creation condition setting unit 202 sets album creation conditions. In the present embodiment, as album creation conditions, model album data, an image group used for an album, the number of album pages and the like are set. In the following, "step S-" is simply abbreviated to "S-".

At S602, the model album data acquisition unit 203 reads the model album data set at S601 and loads the data onto the RAM 103. Further, the model album data acquisition unit 203 reads image data from the HDD 104 in accordance with the image file path stored in the model album data and loads the data onto the RAM 103. The image data that is loaded onto the RAM 103 at this step is sometimes called "model image". That is, the model image is image data that is arranged in the model album data.

At S603, the model image analysis unit 204 analyzes the model image loaded onto the RAM 103 at S602. Here, the image analysis at this step is explained by using FIG. 6B.

At S60301, the model image analysis unit 204 acquires information on the image capturing date corresponding to the image data acquired by the model album data acquisition unit 203. In the present embodiment, the information on the image capturing date is acquired based on Exif information attached to each piece of image data.

At S60302, the model image analysis unit 204 performs object detection and classification of the detected object for the image data acquired by the model album data acquisition unit 203. In the present embodiment, as the object, a face is detected. As the face detection method, it is possible to adopt any publicly known method and as the publicly known method such as this, mention is made of, for example, AdaBoost that creates a strong discriminator from a plurality of prepared weak discriminators. In the present embodiment, by using the strong discriminator created by AdaBoost, the face of a person is detected. The model image analysis unit 204 acquires the top-left coordinate values and the bottom-right coordinate values of the area of the detected face in the image as well as detecting the face. By finding these two kinds of coordinate value, it is possible to specify the position of the face and the size of the face. Further, similar to the face of a person, by also performing AdaBoost to detect each of an animal, such as a dog and a cat, and a dish, it is possible to detect the object of a person, an animal, and a dish and at the same time, classify what is the object within the image. The detection-target object is not limited to those described above, and may be a flower, a building, an ornament and the like. Further, here, the case is explained where objects are classified by using AdaBoost, but it may also be possible to perform image recognition by using a pre-trained model, such as a deep neural network.

At S60303, the model image analysis unit 204 performs personal recognition for the face detected at S60302. First, the model image analysis unit 204 derives a degree of similarity between the extracted face image and the representative face image saved in a face dictionary database for each personal ID. Then, the personal ID whose derived degree of similarity is higher than or equal to a predetermined threshold value and whose degree of similarity is the highest is determined to be the ID corresponding to the extracted face image. That is, the person corresponding to the personal ID whose degree of similarity is higher than or equal to the predetermined threshold value and whose degree of similarity is the highest is specified as the person of the extracted image. In a case where all the degrees of similarity derived for each personal ID are less than the predetermined threshold value, the person of the extracted face image is regarded as a new person and a new personal ID is allocated to the face image of the person and the face image is registered in the face dictionary database. The face dictionary database is stored in, for example, the HDD 104.

At S60304, the model image analysis unit 204 derives a feature quantity for the image data acquired by the model album data acquisition unit 203. As the image feature quantity, mention is made of, for example, color information. As the method of using color information as the image feature quantity, it is possible to use a histogram. In image data, generally, three values of RGB are stored for each pixel. In this case, a histogram is created for each of the R value, the B value, and the G value of the entire image. It is possible to create the histogram by counting the appearance frequency of each range of a certain value. For example, in a case where the pixel value is stored as a value between 0 and 255 and the appearance frequency is counted at 16 levels (from 0 o 15, 16 to 31, . . . , 240 to 255), three values×16 levels=a 48-dimensional feature quantity is obtained. The image feature quantity is not limited to this. For example, it may also be possible to use a feature quantity by a deep neural network. Specifically, in a case where an image is input to a network that performs object recognition, an intermediate value during the calculation process is obtained, in addition to numerical values indicating the kind of object and the probability thereof, which are recognition results. In this intermediate value, the image feature for recognizing the object is compressed, and therefore, it is possible to use the intermediate value as the feature quantity indicating an image. In addition, it may also be possible to use the object detected at S60302 and S60303 and the results of personal recognition as the feature quantity. For example, it may also be possible to use the number of persons captured in an image as the feature quantity or it may also be possible to use the appearance frequency in the entire image group of captured persons based on personal recognition results.

Here, the aspect is explained in which the model image analysis unit 204 analyzes image data, but the present embodiment is not limited to this. For example, an embodiment is considered in which the results of the analysis by the model image analysis unit 204 are saved in the HDD 104. It may also be possible for the model image analysis unit 204 to check whether the analysis results of an image are saved in the HDD 104 and read the analysis results in a case where they are saved.

It is not necessary to perform the analysis processing at S603 each time. That is, the processing at S603 is performed once for one piece of model album data and the processing results are saved. Then, from the next time, it is possible to acquire the analysis information that is obtained by the analysis processing at S603 by reading the processing results.

Explanation is returned to FIG. 6. At S604, the candidate image acquisition unit 205 reads the image group that is set at S601 from the HDD 104 and loads the image group onto the RAM 103.

At S605, the candidate image analysis unit 206 analyzes the candidate image loaded onto the RAM 103 at S604. Here, the image analysis at this step is explained by using FIG. 6. S60501 to S60504 are the same analysis processing as that at S60301 to S60301, and therefore, details are omitted.

At S60501, the candidate image analysis unit 206 acquires information on the image capturing date corresponding to the image data acquired by the candidate image acquisition unit 205.

At S60502, the candidate image analysis unit 206 performs object detection and classification of the detected object for the image data acquired by the candidate image acquisition unit 205.

At S60503, the candidate image analysis unit 206 performs personal recognition for the face detected at S60502.

At S60504, the candidate image analysis unit 206 derives the feature quantity of the image for the image data acquired by the candidate image acquisition unit 205.

At S60505, the candidate image analysis unit 206 gives an image score indicating whether the image is an image suitable to the album to the image group acquired by the candidate image acquisition unit 205. As the image score, mention is made of, for example, an in-focus degree. As the determination method of an in-focus degree, it is possible to use the detection method of an edge and as the detection method of an edge, it is possible to use the publicly known Sobel filter. The luminance gradient, that is, the gradient of edge is calculated by detecting an edge in an image by the Sobel filter and dividing the luminance difference between the start point and the endpoint of the edge by the distance between the start point and the endpoint. By calculating the average gradient of edge in the image, it is possible to regard that the image whose average gradient is large is more in focus than the image whose average gradient is small. In the present embodiment, a plurality of threshold values for measuring the magnitude of the calculated average gradient of edge is set and by determining whether the calculated gradient of edge is larger than or equal to which of the threshold values, whether the in-focus degree may be accepted is determined. Specifically, as two different gradient threshold values, a first gradient threshold value and a second gradient threshold value (here, first gradient threshold value>second gradient threshold value) are set and the in-focus degree is determined to be one of three levels, that is, ○, Δ, and x. In a case where the average gradient of edge in the image is larger than or equal to the first threshold value, the in-focus degree is determined to be preferable (indicated by ○). Further, in a case where the average gradient of edge in the image is less than the first threshold value and larger than or equal to the second threshold value, the in-focus degree determined to be acceptable (indicated by Δ) and in a case where the average gradient of edge is les than the second threshold value, the in-focus degree is determined to be unacceptable (indicated by x). Due to this, it is possible to make high the score of the image in focus. Here, as the score indicating the image quality, the in-focus degree is adopted but the score that can be adopted in the present embodiment is not limited to this. For example, it may also be possible to use the image size, or use image capturing information, such as information on a lens used at the time of image capturing, or use the compression format of the image that is input to the application.

Further, it may also be possible to give a score by contents captured in the image other than the image quality. For example, it is possible to use the size of the face derived at S60502 and the personal recognition results at S60503. First, the person whose appearance frequency is the highest in the personal recognition results is set as the main object. In a case where the main object is not captured in the image, a score of 0 is given and in a case where the main object is captured, the ratio of the size of the face of the person set as the main object to the image size is taken as the score of each main object. Here, scoring of each main subject is performed by using the face size, but it may also be possible to use one other than the face size. For example, it may also be possible to determine the expression of a person who is the main object and increase the score in a case where the face is a smiling face. Further, in a case where an object other than a person is set as the main object, it may also be possible to similarly perform scoring in accordance with the object size by using the results of the object detection and the classification at S60502.

Explanation is returned to FIG. 6. At S606, the layout creation unit 208 selectively determines the double-page spread number for which layout creation is performed. Here, it is assumed that selection is performed in order from the first double-page spread.

At S607, the similar image selection unit 207 selects a candidate image that is arranged on the double-page spread of the double-page spread number determined at S606 based on the model image analysis results of the analysis by the model image analysis unit 204 and the candidate image analysis results of the analysis by the candidate image analysis unit 206. In the present embodiment, first, the similar image selection unit 207 acquires the image feature quantity relating to the model image arranged on the double-page spread of the double-page spread number determined at S606 in the model image analysis results of the analysis by the model image analysis unit 204. After that, for the acquired image feature quantity of each model image, the degree of similarity of the image feature quantity of each candidate image is calculated. It is possible to calculate the degree of similarity by using, for example, the Euclid distance between the two feature quantities. The candidate image whose degree of similarity is the highest is selected as a similar image. Further, the candidate image that has been selected once is excluded from the target of the subsequent calculation of degree of similarity so that the same candidate image is not selected again. Here, a similar image is selected by using the image feature quantity, but the variable that can be used to select a similar image is not limited to this. For example, it may also be possible to use the image score that is acquired as the analysis results by the candidate image analysis unit 206. Specifically, it may also be possible to select the candidates images whose degree similarity is the top five from among the candidate images for the image feature quantity of each model image and further, select the candidate image whose image score is the highest among the selected five candidate images as the similar image. Furthermore, in another example, it may also be possible to use the personal recognition results acquired by the model image analysis unit 204 and the candidate image analysis unit 206 performing the analysis. For example, in a case where the main object is captured in the model image, the candidate image in which the main object is not captured is not selected as the similar image even though the degree of similarity thereof is high.

Figure 7:
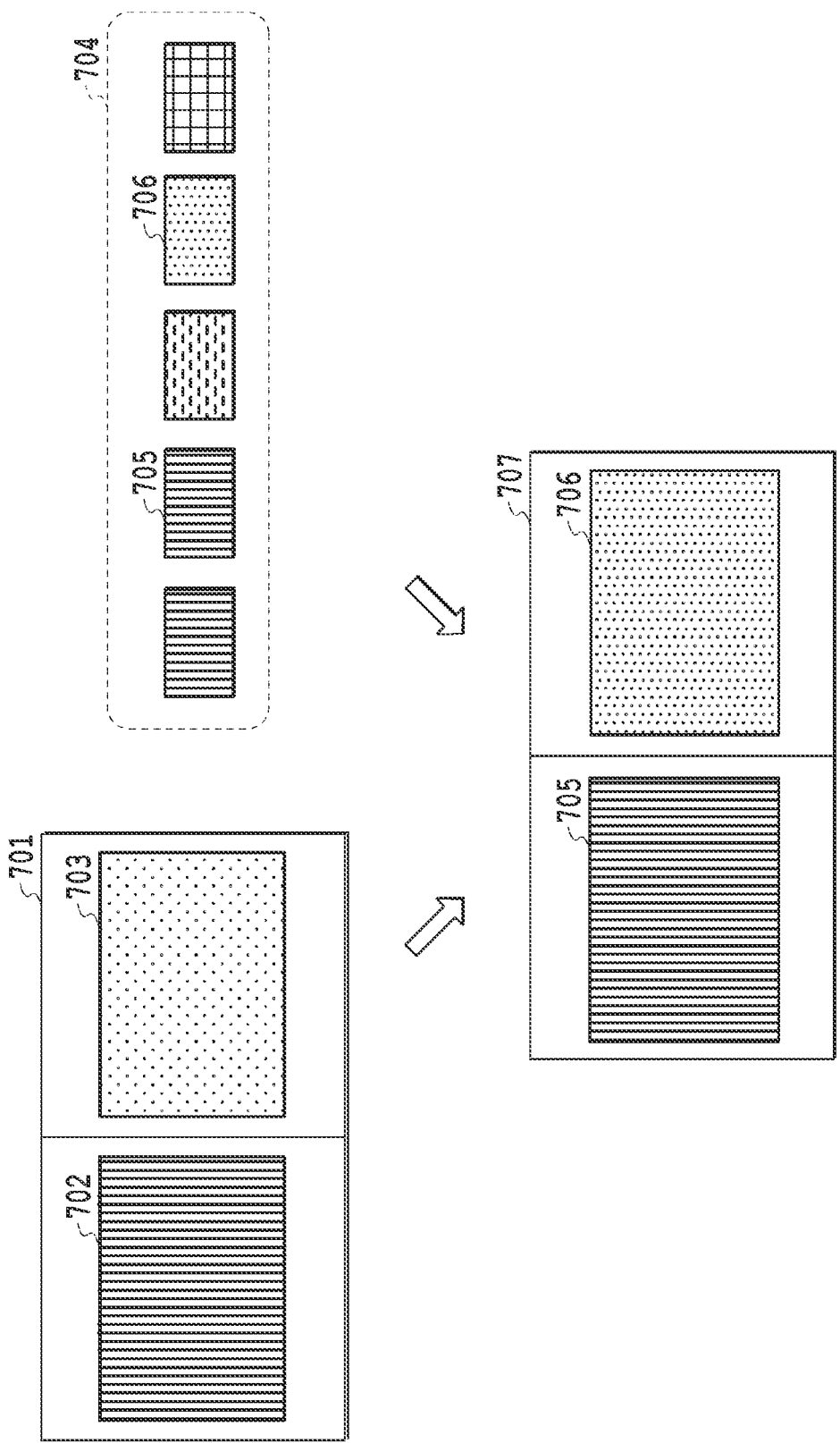
FIG. 7 is a diagram explaining a layout creation method.

At S608, the layout creation unit 208 allocates the similar image selected at S607 to the model template. Here, the layout creation method in the present embodiment is explained by using FIG. 7. FIG. 7 shows the model template of the double-page spread selected at S606 and an example of a layout that the layout creation unit 208 creates. First, the layout creation unit 208 acquires a model template 701. The model template 701 is the model template corresponding to the double-page spread number determined at S606 among the model templates acquired by the model album data acquisition unit 203. In the model template 701, model images and arrangement information thereon are stored. Model images 702 and 703 indicate the images and the arrangement thereof. A candidate image group 704 indicates the image group acquired by the candidate image acquisition unit 205. Similar images 705 and 706 indicate the similar images selected at S607 and the similar image 705 is an image similar to the model image 702 and the similar image 706 is an image similar to the model image 703. The layout creation unit 208 creates the layout by arranging the similar images 705 and 706 at the same positions of the corresponding model images. A layout 707 is the layout created by the layout creation unit 208. By the processing explained above, it is possible to create the layout similar to the model template.

At S609, the layout creation unit 208 determines whether the processing at S606 to S608 is completed for all the double-page spreads in the album data acquired by the model album data acquisition unit 203. In a case where the determination results at this step are affirmative, the processing advances to S610 and on the other hand, in a case where the determination results are negative, the processing returns to S606.

At S610, the number of album pages comparison unit 209 determines whether the number of pages of the album to be created, which is set by the album creation condition setting unit 202 at S601, and the number of pages of the model album, which is included in the album data acquired by the model album data acquisition unit 203, are the same. In a case where the determination results at this step are affirmative, the processing advances to S615 and on the other hand, in a case where the determination results are negative, the processing advances to S611.

At S611, the number of album pages comparison unit 209 compares the number of pages of the album to be created and the number of pages of the model album and determines a magnitude relationship. Specifically, the number of album pages comparison unit 209 determines whether the number of pages of the album to be created is smaller than the number of pages of the model album (number of pages of album to be created<number of pages of model album). In a case where the determination results at this step are affirmative, the processing advances to S612 and on the other hand, in a case where the determination results are negative, the processing advances to S614.

At S612, the album priority order setting unit 210 sets the priority order for all the double-page spreads created by the layout creation unit 208. The double-page spread whose priority order is high is used in the album preferentially compared to the double-page spread whose priority order is low.

At S613, the number of album pages reducing unit 211 reduces the number of album pages by deleting pages in accordance with the priority order that is set at S612 until the number of pages becomes equal to the number of pages of the album to be created, which is acquired by the album creation condition setting unit 202.

At S614, the number of album pages increasing unit 212 increases the number of album pages by adding pages until the number of pages becomes equal to the number of pages of the album to be created, which is acquired by the album creation condition setting unit 202.

At S615, the album data output unit 213 outputs the layouts of all the double-page spreads and the commodity material information that is set by the album creation condition setting unit 202 all together as album data. The layouts of all the double-page spreads are the layout created by the layout creation unit 208, the layout from which pages have been deleted by the number of album pages reducing unit 211, or the layout to which pages are added by the number of album pages increasing unit 212. For example, the album data is in the form as shown in FIG. 3A and FIG. 3B and saved in the HDD 104.

The above is the contents of the automatic layout processing in the present embodiment.

Figure 8:
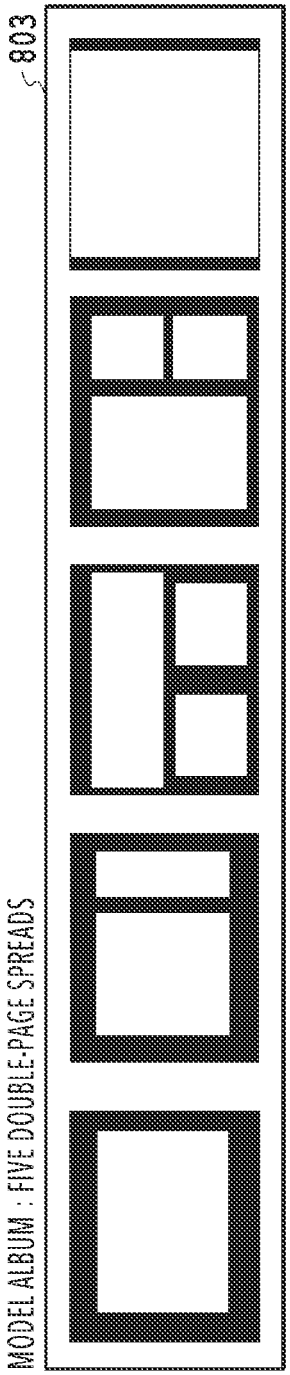
FIG. 8 is a diagram explaining page deletion.
Figure 8:
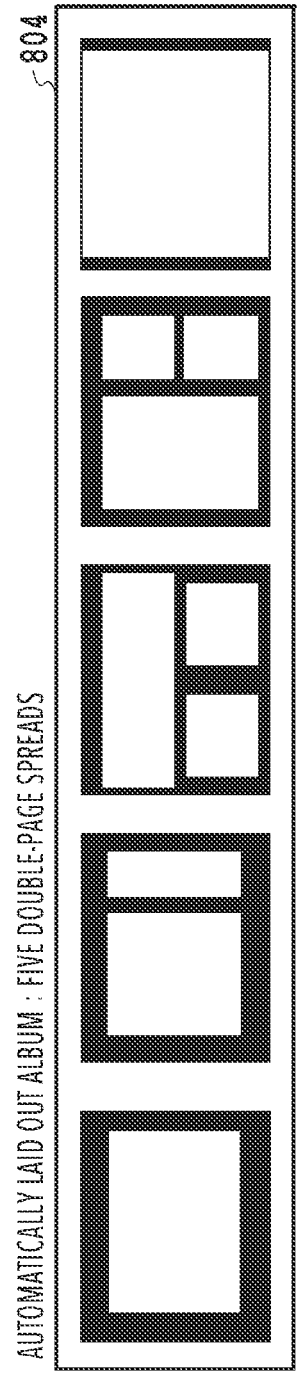
Figure 8:
Figure 8:
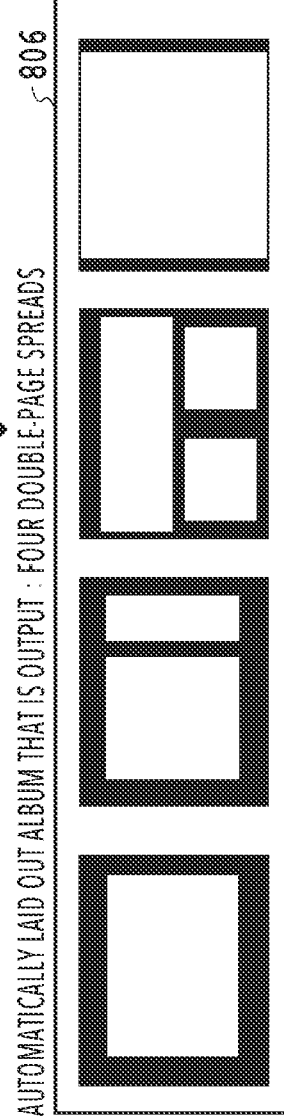

FIG. 8 is a diagram explaining the number of pages reduction by the page deletion in the present embodiment. FIG. 8 shows an example in which an album with a designated number of pages is created in a case where a number 802 of pages of an album that is desired to be created is smaller than a number 801 of pages of a model album. In a case where a model album 803 is an album including five double-page spreads, an album 804 including five automatically laid out double-page spreads and similar to the model album is created by the layout creation unit 208. Then, the album priority order setting unit 210 sets a priority order 805 in the unit of double-page spread for the album including the five automatically laid out double-page spreads. Then, the number of album pages reducing unit 211 refers to the priority order and deletes the fourth double-page spread whose priority order is the lowest. As a result of that, an automatically laid out album 806 that is output is created, which includes the four double-page spreads, whose number of pages is the same as the number 802 of pages of the album desired to be created.

About Effects of the Present Embodiment

As described previously, in the present embodiment, in a case where the designate number of pages of the album to be created is smaller than the number of pages of the model album, the priority order is set and in accordance with the set priority order, page deletion is performed for the created album layout. Due to this, it is possible to create an album with the number of pages desired by a user without losing the consistency of the story of the album.

Second Embodiment

Figure 9:
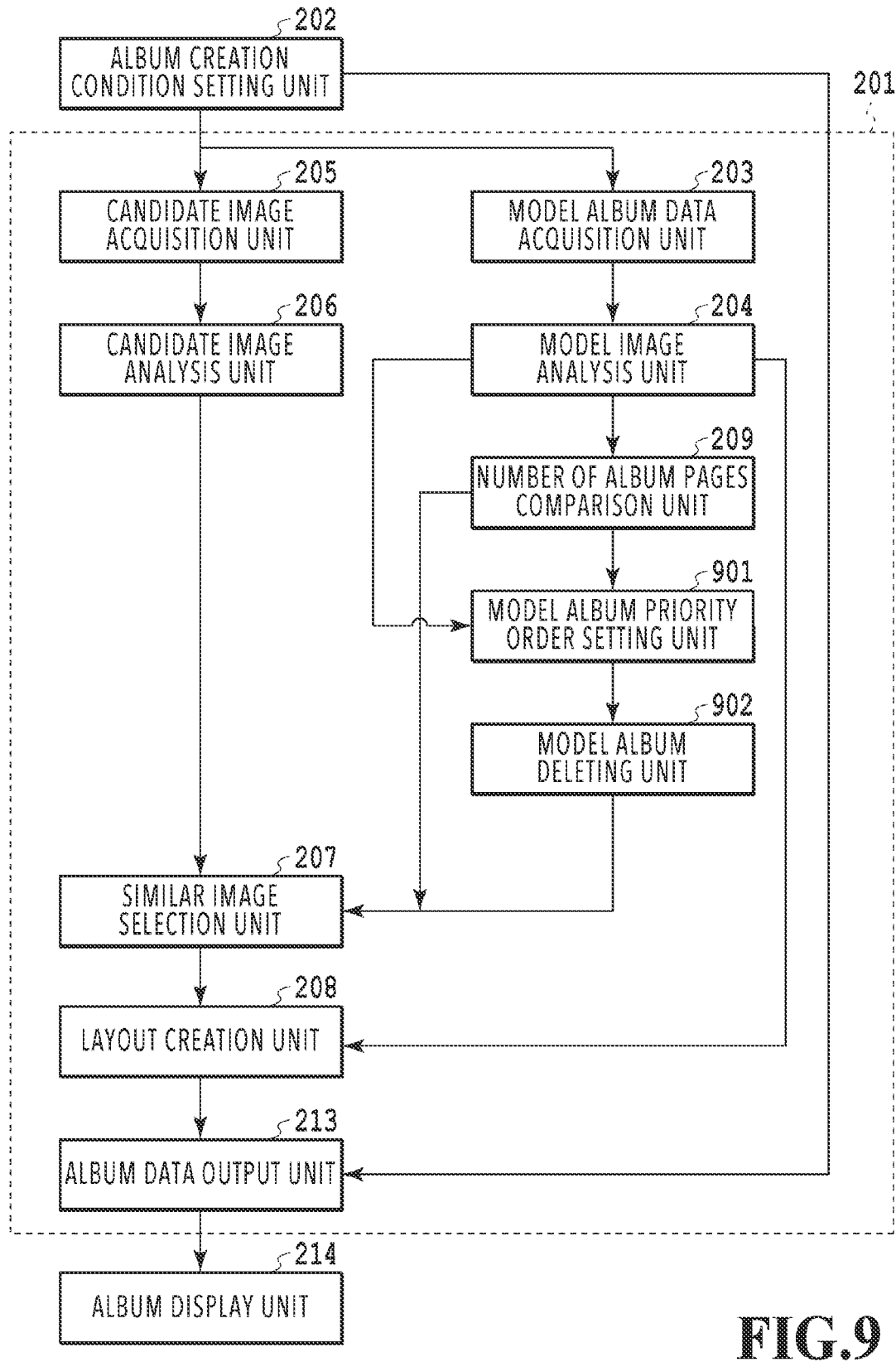
FIG. 9 is a block diagram showing a software configuration of an image processing apparatus.
Figure 10:
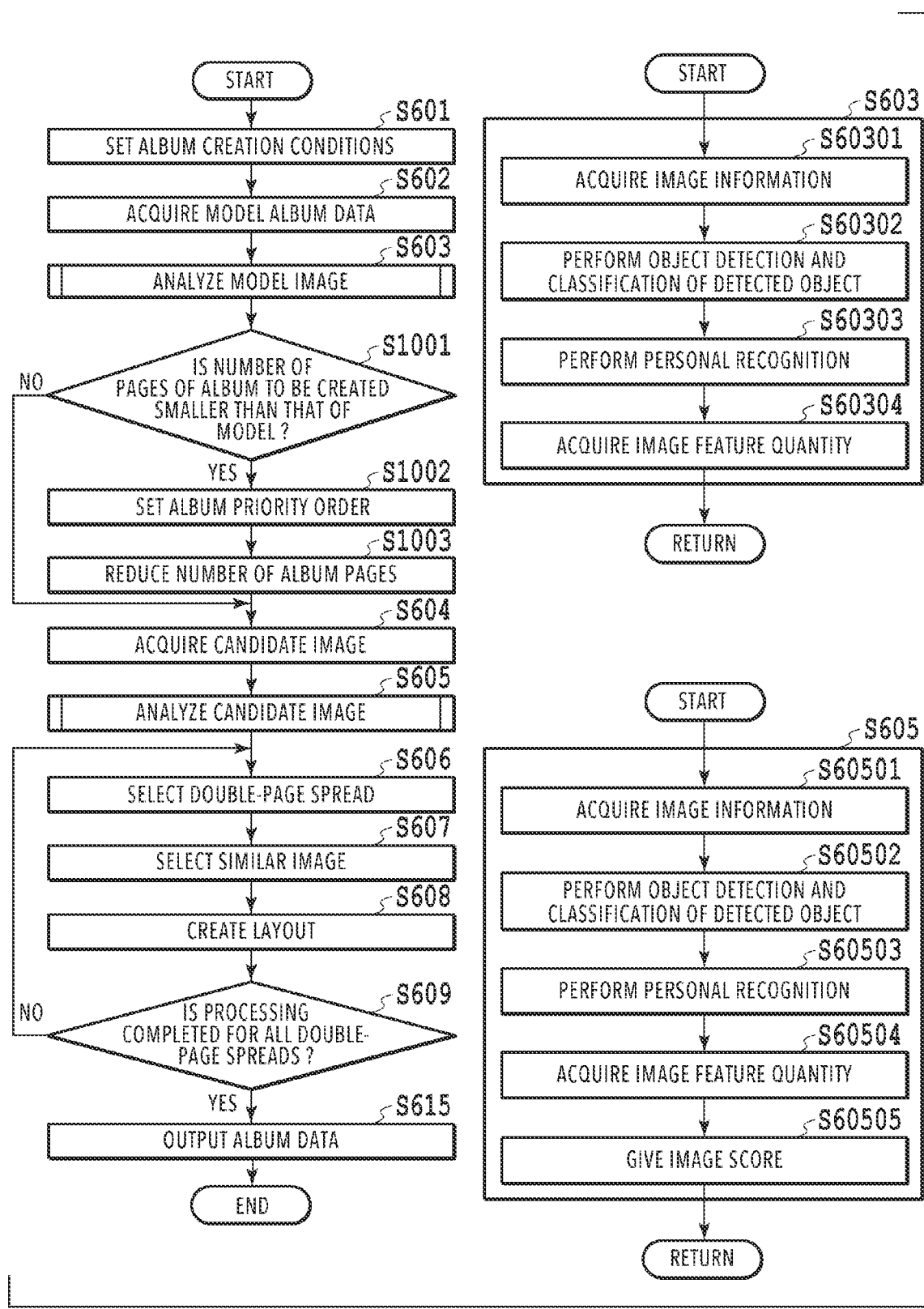
FIG. 10 is a flowchart of automatic layout processing.

In the first embodiment, page deletion for the created album layout is performed. In contrast to this, in the present embodiment, the album layout is created after deleting the page of the model album. In the following, differences from the already described embodiment are explained mainly and explanation of the same contents as those of the already described embodiment is omitted appropriately.
<About Software Configuration and Automatic Layout Processing of Image Processing Apparatus>
FIG. 9 is a block diagram showing the software configuration of an image processing apparatus in the present embodiment. FIG. 10 is a flowchart of processing to perform the automatic layout of the album creation application in the present embodiment. Here, by attaching the same sign as that of the embodiment described previously to the same element as that of the embodiment described previously, explanation is omitted.

A model album priority order setting unit 901 sets a priority order that is used at the time of deleting photo images from an already-laid-out model album acquired by the model album data acquisition unit 203. It may also be possible to set this priority order in the unit of page or in the unit of double-page spread or for each slot. As the setting method of a priority order, it may also be possible for a user to directly designate the priority order for the model album or use data attached originally to the model album from the beginning as part of the model album data. As another setting method of a priority order, mention is made of a method of setting a priority order in accordance with the importance level. The importance level here may be the slot size or it may also be possible to set high the importance level for the slot whose image score is high, which is calculated by the candidate image analysis unit 206. Further, in a case where the importance level for the model album is set as the model album data, it may also be possible to read the importance level, or a user may set the importance level directly. In addition, it may also be possible to set the importance level so that the balance of the time axis is made better. Making the balance of the time axis better refers to obtaining a better balance in a case where the photos whose times are close are deleted and the photos are arranged on the time axis. Further, it may also be possible to make an evaluation by using a combination of the plurality of kinds of method described here. Here, it is assumed that the priority order of the model album is designated by a user directly.

A model album deleting unit 902 deletes the page of the model album in accordance with the priority order set by the model album priority order setting unit 901 until the number of pages of the model album becomes equal to the number of pages set by the album creation condition setting unit 202. As the method of deleting a page, in a case where the priority order is set for each slot, it may also be possible to delete a slot in order from the lowest priority order or to find the average, median, maximum value, or minimum value of the priority order in the unit of page and delete a page in order of the calculated value. Alternatively, it may also be possible to perform the deletion such as this in the unit of double-page spread. As another deletion method, it may also be possible to delete a page without deleting a photo (that is, without reducing the number of photos) by reducing the size of the slot. At this time also, the page deletion is performed in accordance with the priority order.

At S1001, the number of album pages comparison unit 209 compares the number of pages of the album to be created, which is set by the album creation condition setting unit 202, and the number of pages of the model album, which is included in the album data acquired by the model album data acquisition unit 203, and determines a magnitude relationship. Specifically, the number of album pages comparison unit 209 determines whether the number of pages of the album to be created is smaller than the number of pages of the model album (number of pages of the album to be created<number of pages of the model album). In a case where the determination results at this step are affirmative, the processing advances to S1002 and on the other hand, in a case where the determination results are negative, the processing advances to S604.

At S1002, the model album priority order setting unit 901 sets a priority order for each page of all the double-page spreads in the model album.

At S1003, the model album deleting unit 902 performs the page deletion of the model album in accordance with the priority order set at S1002 until the number of pages of the model album becomes the same as the number of pages of the album to be created.

About Effects of the Present Embodiment

As described previously, in the present embodiment, in a case where the number of pages of the album to be created is smaller than the number of pages of the model album, the album layout is created after deleting pages of the model album. Due to this, it is possible to create an album with the number of pages desired by a user without losing the consistency of the story of the album.

Third Embodiment

In the present embodiment, the number of pages is reduced by performing scene classification by dividing an image group based on the image capturing time and performing page deletion based on the scene.

<About Software Configuration and Automatic Layout Processing of Image Processing Apparatus>

Figure 11:
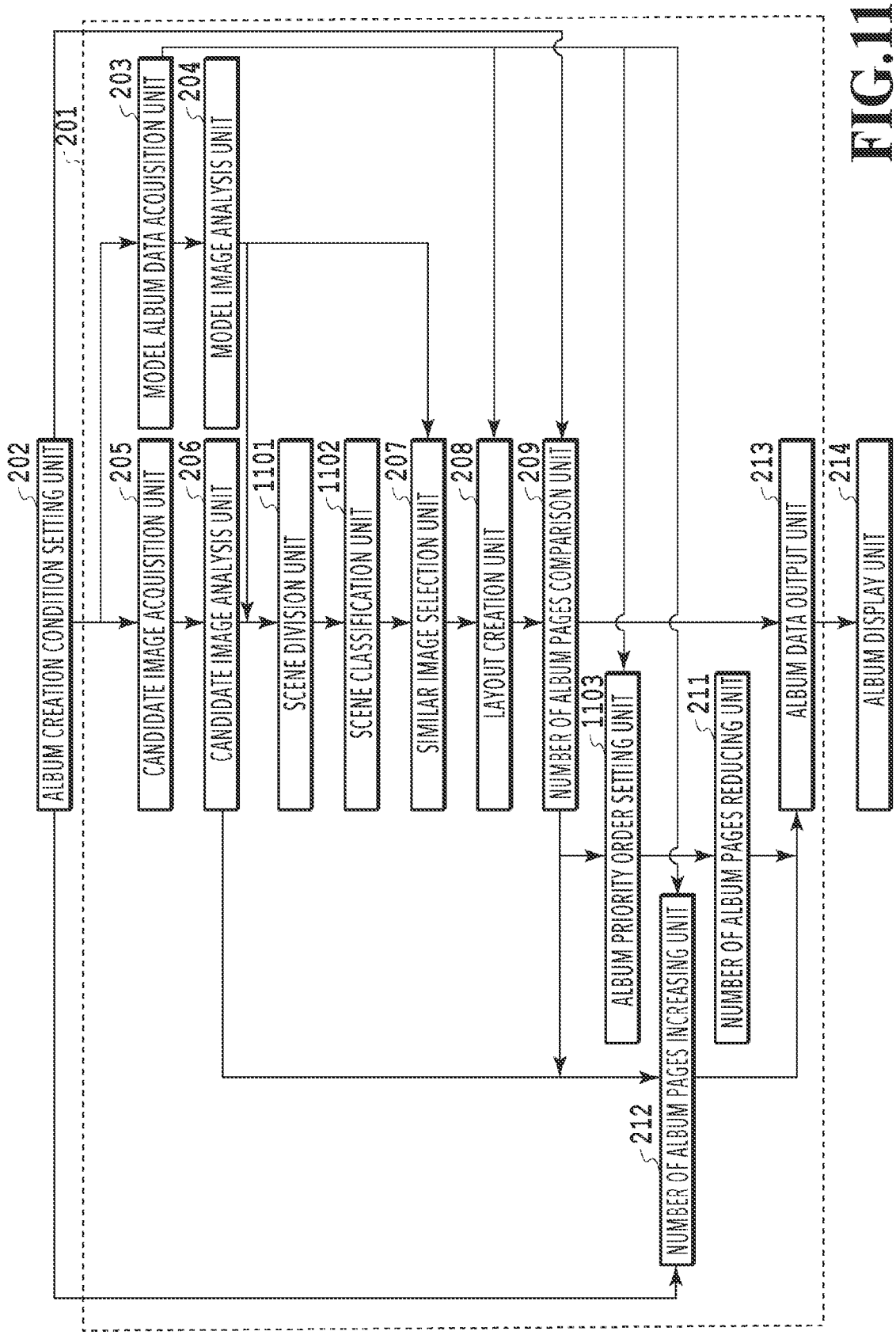
FIG. 11 is a block diagram showing a software configuration of an image processing apparatus.
Figure 12:
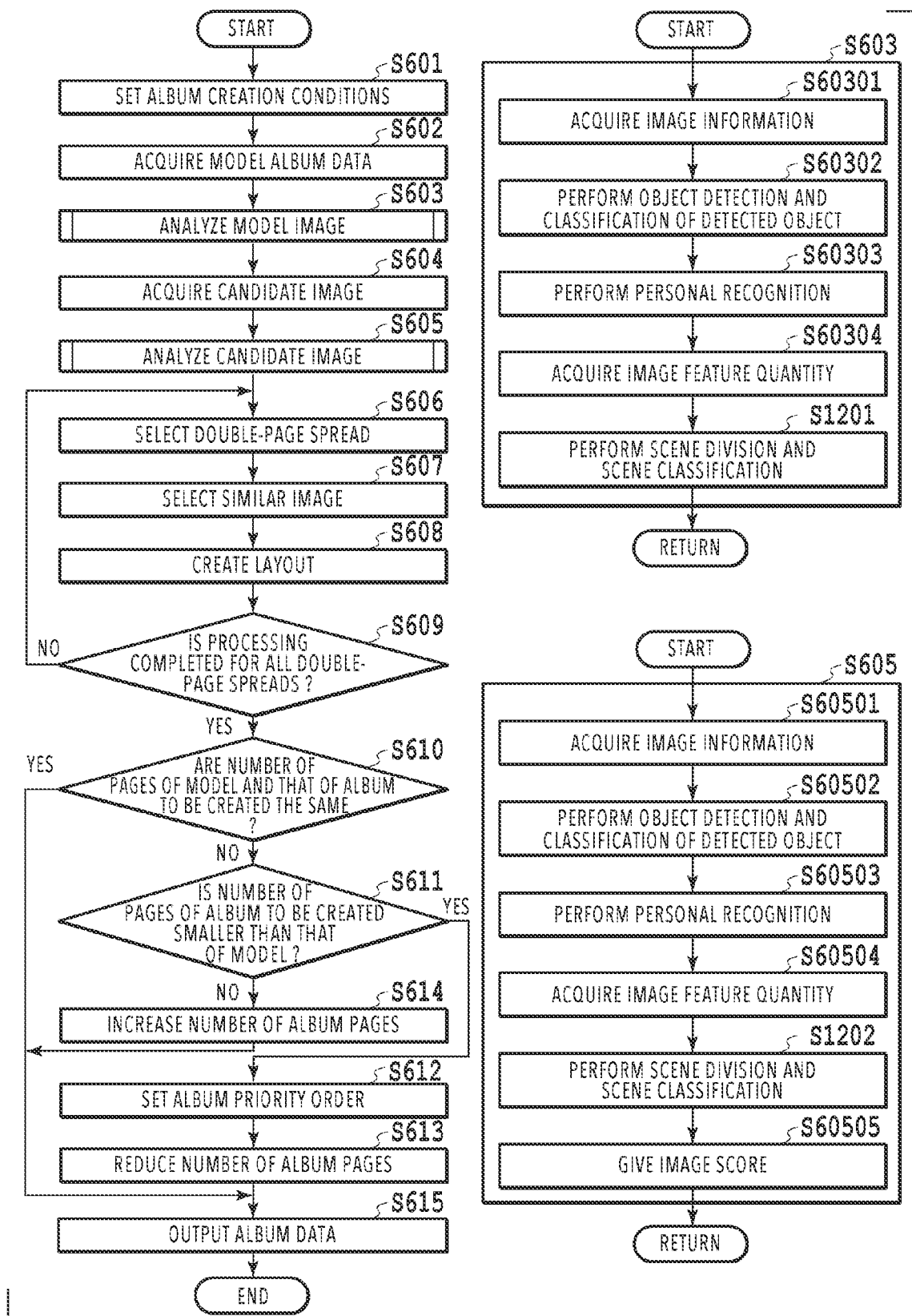
FIG. 12 is a flowchart of automatic layout processing.

FIG. 11 is a block diagram showing the software configuration of an image processing apparatus in the present embodiment. FIG. 12 is a flowchart of processing to perform the automatic layout of the album creation application in the present embodiment. Here, by attaching the same sign as that of the embodiments described previously to the same element as that of the embodiments described previously, explanation is omitted.

A scene division unit 1101 divides the image group acquired by the candidate image acquisition unit 205 into a sub image group for each scene by using the analysis information derived by the candidate image analysis unit 206.

A scene classification unit 1102 determines the relevant category for each scene obtained by the scene division unit 1101. As the category of scene, mention is made of, for example, a situation, such as indoor or outdoor, an event at the time of capturing photos, such as a journey and a wedding, and the like.

Specifically, the image group is divided into a plurality of sub image groups based on the time difference in the image capturing date between images by using the information on the image capturing date already acquired by the candidate image analysis unit 206 and the model image analysis unit 204. An example of the actual division is as follows. Among the image group, attention is focused on the image whose image capturing time is the oldest (or newest) and the time difference from the image capturing time of the image whose image capturing time is the second oldest (or newest) and whether the calculated time difference is larger than or equal to a predetermined threshold value is determined. The processing such as this is performed for all images while replacing the image of interest with the image whose image capturing time is newer (or older). The "division" in the present embodiment means that the image group is divided into a group whose image capturing time is new and a group whose image capturing time is old at the border between two images. In the present embodiment, in a case where the difference between the image capturing time of the image of interest and the image capturing time of the next older (or newer) image is longer than or equal to 16 hours, the image group is divided so that these images belong to different sub image groups. The threshold value of the time difference used at the time of division is not limited to this.

Further, in the present embodiment, the scene division is performed by using the information on the image capturing date, but the information that is used is not limited to this. For example, it may also be possible to divide an image group so that images whose image capturing positions are close to one another belong to the same scene by using information on the image capturing position. As another example, personal recognition results may be used. For example, in a graduation album, by registering in advance the images of students belonging to a certain group (class, club activity and the like), it may also be possible to take an image group putting together images in which the students belonging to the group are captured as one scene (sub image group). As a still another example, information other than image information may be used. Here, a method of putting together similar events as one scene is explained. The folder name in which images are saved and tag information attached in the social networking service or the like are acquired as meta information attached to images. For example, by the search word, such as "athletic meet" and "school excursion", an image group having meta information including the search word is taken as one scene. As regards designation of the search word, it may also be possible for a user to select the search word from among the search words incorporated in advance in the application via the album creation condition setting unit 202 or to input the search word in the text box.

For example, in a case where a ceremony is classified into one of wedding an reception, the top two persons most frequently captured in all the images are taken as the bride and bridegroom by using the personal recognition results. Then, it may also be possible to classify a scene in which there are many photos in which only the bride and bridegroom are captured as wedding and a scene in which there are many photos in which persons other than the bride and the bridegroom are also captured as reception. Further, it may also be possible to derive the feature quantity by machine learning. For example, it may also be possible to perform the scene classification by preparing the scene desired to be classified and the image group representing the scene and performing learning by using Convolution Neural Network (CNN) so that the input is the image and the output is the scene classification results.

Here, the aspect is explained in which the model image analysis unit 204 analyzes the image data, but the present embodiment is not limited to this. For example, an embodiment is considered in which the results of the analysis by the model image analysis unit 204 are saved in the HDD 104. It may also be possible for the model image analysis unit 204 to check whether the image analysis results are saved in the HDD 104 and read the analysis results in a case where they are saved.

An album priority order setting unit 1103 sets a priority order based on the scene classification results by the scene division unit 1101 and the scene classification unit 1102. Specifically, mention is made of a method of setting a priority order in the following two patterns. The first pattern is a pattern of setting a priority order so that the number of double-page spreads for each classified scene is the same. In a case where this pattern is adopted, a priority order is set for the double-page spread within a scene in which the number of double-page spreads is large compared to that in another scene. The album priority order setting unit 1103 determines the priority order within this scene by using the same method as that of the album priority setting unit 210 described previously. In the album after the page deletion, which is created by performing the setting of the priority order by this method, images are arranged so that the balance of the number of images for each scene existing in the model is favorable, and therefore, it is possible to keep the consistency of the story of the album.

The second pattern is a pattern of setting the priority order in the unit of classified scene. The album priority order setting unit 1103 determines the priority order in the unit of scene by using the same method as that of the album priority order setting unit 210 described previously. In a case where the setting of the priority order is performed by this method, on a condition that attention is focused on each individual scene in the album after the page deletion, the deletion within the scene is not performed, and therefore, it is possible to keep the consistency of the story within the scene. It may also be possible for a user to designate which of these two patterns to use or determine in advance a method of designating which of these two patterns to use.

At S1201, the scene division unit 1101 and the scene classification unit 1102 perform the scene division and the scene classification for the image group acquired by the model album data acquisition unit 203.

At S1202, the scene division unit 1101 and the scene classification unit 1102 perform the scene division and the scene classification for the image group acquired by the candidate image acquisition unit 205.

About Effects of the Present Embodiment

As described previously, in the present embodiment, in a case where the number of pages of the album to be created is smaller than the number of pages of the model album, the page deletion based on the scene for the created album layout is performed. Due to this, it is possible to create an album with the number of pages desired by a user without losing the consistency of the story of the album.

Fourth Embodiment

In the present embodiment, processing to delete an image that is not similar to the image used in the model album for the album layout created based on the model album.

Figure 13:
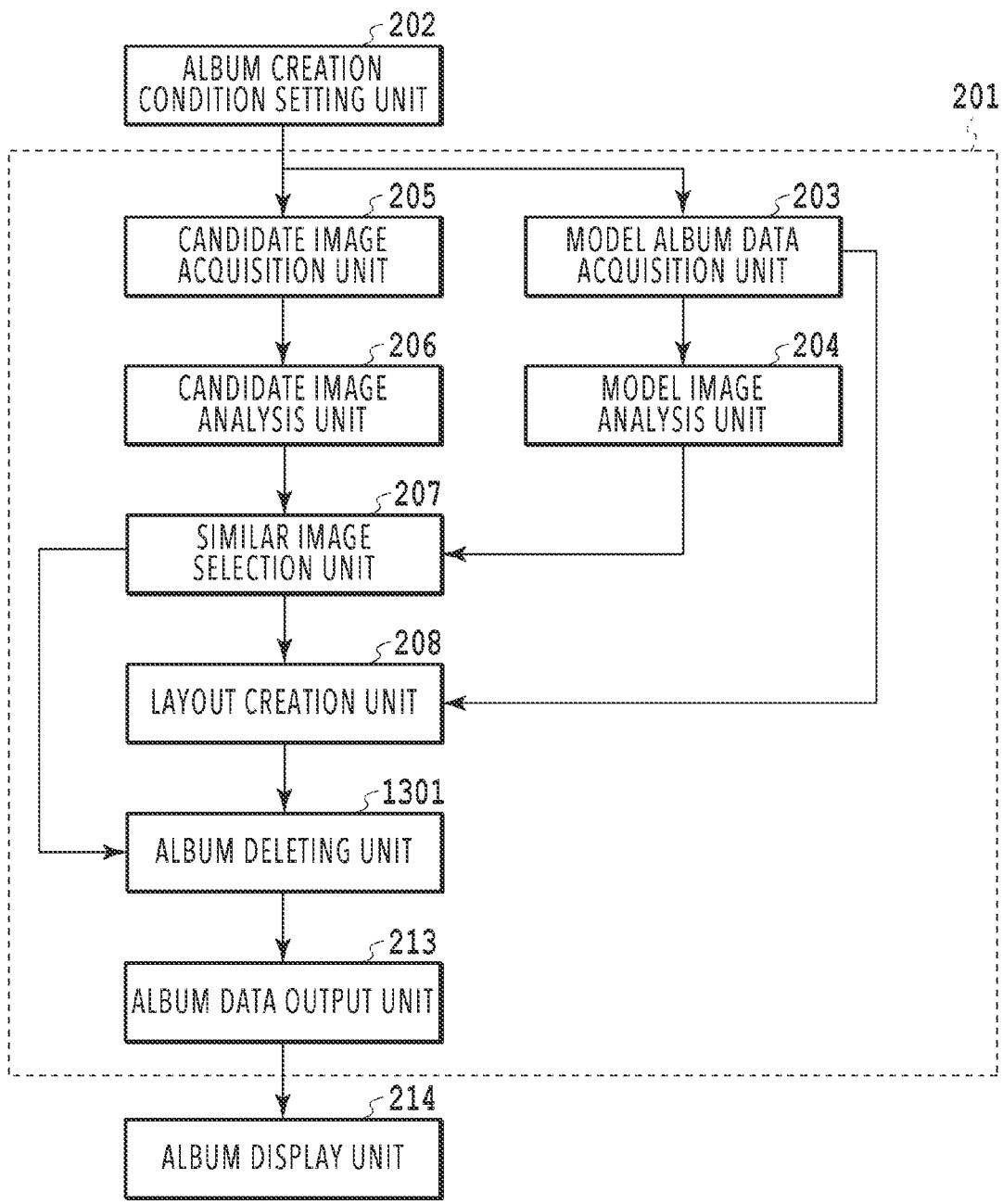
FIG. 13 is a block diagram showing a software configuration of an image processing apparatus.
Figure 14:
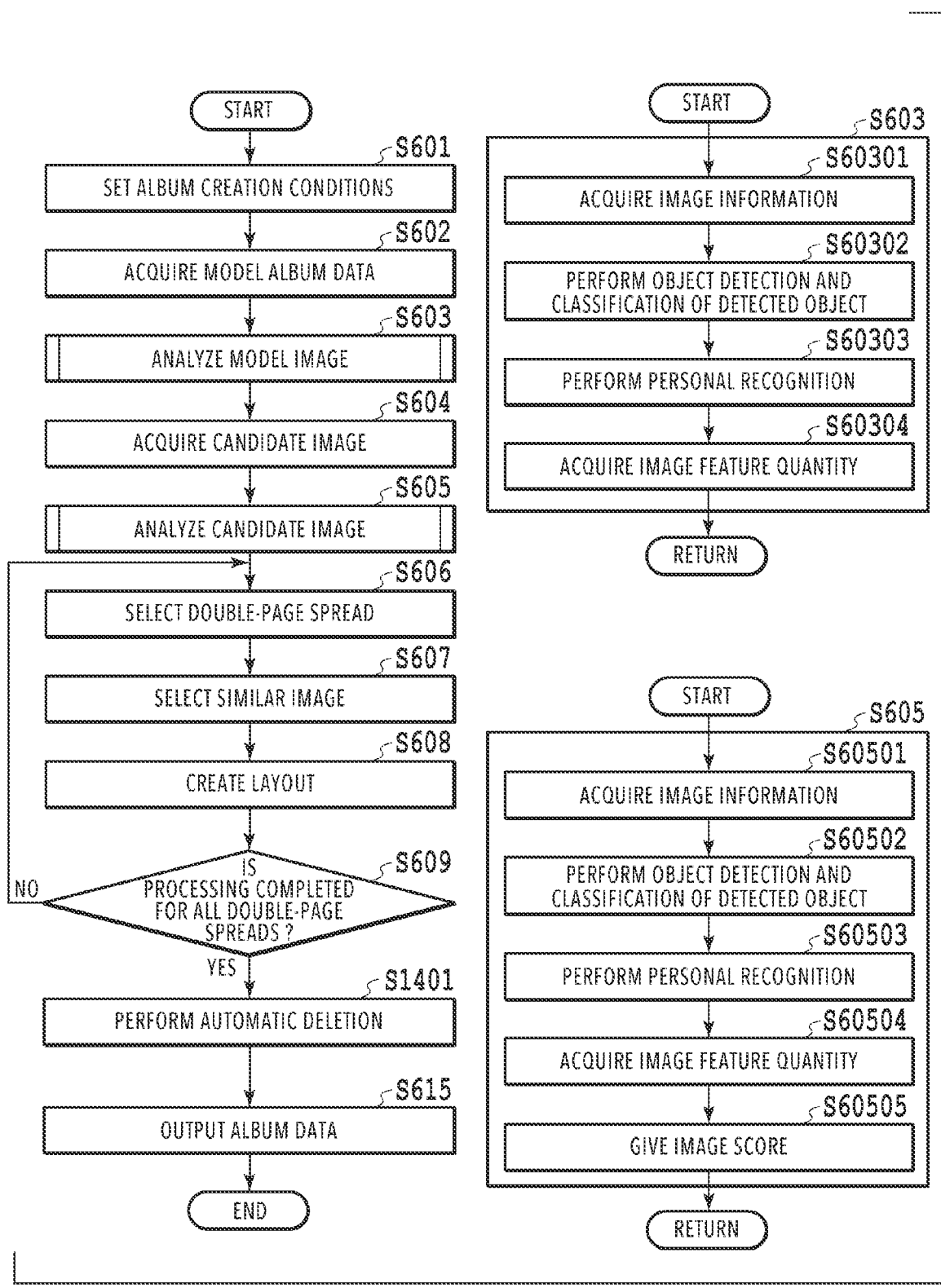
FIG. 14 is a flowchart of automatic layout processing.

FIG. 13 is a block diagram showing the software configuration of an image processing apparatus in the present embodiment. FIG. 14 is a flowchart of processing to perform the automatic layout of the album creation application in the present embodiment. Here, by attaching the same sign as that of the embodiments described previously to the same element as that of the embodiments described previously, explanation is omitted.

An album deleting unit 1301 performs slot deletion, page deletion, or double-page spread deletion for the already-created laid out album. Here, it is assumed that as a reference to selectively determine a deletion target, the degree of similarity (degree of model reproducibility) is used. This degree of similarity is the degree of similarity found by the similar image selection unit 207. A predetermined threshold value for the degree of similarity is set in advance and the predetermined threshold value and the degree of similarity are compared. Then, the slot, the page, or the double-page spread whose degree of similarity is lower than the predetermined threshold value is determined as the deletion target. By using the degree of similarity as described above, it is possible to delete the image or the like that is not similar and should not be selected. Consequently, it is possible to avoid a layout in which an image or the like that is not similar is arranged, and therefore, it is possible to prevent an album whose consistency of the story is not kept from being created. As the setting method of a threshold value, it may also be possible for a user to set a threshold value arbitrarily, or set in advance a threshold value as a constant, or a threshold value may be determined automatically so that the number of pages of the album desired to be crated is obtained.

At S1401, the album deleting unit 1301 performs automatic deletion based on the degree of similarity to the model for all the double-page spreads created by the layout creation unit 208. It may also be possible to perform the deletion at this step in the unit of slot, the unit of page, or the unit of double-page spread.

About Effects of the Present Embodiment

According to the present embodiment, it is possible to prevent an image that is not similar to the image of the model album from being used. Consequently, it is possible to prevent an album whose consistency of the story is not kept from being created.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, in a case where the number of pages of an album to be created is smaller than the number of pages of a model album, it is made possible to delete pages while guaranteeing the consistency of the story of the album.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-045629, filed Mar. 16, 2020, which is hereby incorporated by reference wherein in its entirety.

What is claimed is:

1. A non-transitory computer readable storage medium storing a program for causing a computer to:
   select, based on image feature value of each of a plurality of model images used in a model album and image feature values of each image in a candidate image group that is used in an album, similar images similar to the model images from among the candidate image group;
   create a layout in which the similar images selected are arranged in templates of the model album;
   set a priority order for each element configuring the layout in a case where a number of pages of an album to be created is smaller than a number of pages of the model album; and
   reduce a number of pages of the layout in accordance with the priority order.

2. A non-transitory computer readable storage medium storing a program for causing a computer to:

set a priority order for each element configuring a model album in a case where a number of pages of an album to be created is smaller than a number of pages of the model album;

reduce the number of pages of the model album in accordance with the priority order;

select, based on image feature value of each of a plurality of model images used in the model album whose number of pages has been reduced and image feature value of each image of a candidate image group that is used in an album, similar images similar to the model images from among the candidate image group; and create a layout in which the similar images selected are arranged in templates of the model album whose number of pages has been reduced.

3. The storage medium according to claim 1, further causing the computer to:

perform control so that a display unit displays a graphical user interface for a user to designate a number of pages of an album to be created.

4. The storage medium according to claim 1, further causing the computer to:

set album creation conditions; and set data relating to the model album, data relating to the candidate image group, and an album commodity material as the album creation conditions.

5. The storage medium according to claim 1, further causing the computer to:

acquire image feature value of each of the plurality of model images used in the model album; and acquire image feature value of each image of the candidate image group.

6. The storage medium according to claim 1, further causing the computer to:

analyze each of the plurality of model images used in the model album; and analyze each image of the candidate image group.

7. The storage medium according to claim 1, further causing the computer to:

determine whether a number of pages of an album to be created is smaller than a number of pages of the model album.

8. The storage medium according to claim 1, wherein an element for which the priority order is set is a slot, a page, a double-page spread, or a scene.

9. The storage medium according to claim 1, further causing the computer to:

classify the candidate image group for each scene.

10. The storage medium according to claim 9, further causing the computer to:

set the priority order in a unit of scene.

11. The storage medium according to claim 9, further causing the computer to:

set the priority order within a scene.

12. The storage medium according to claim 1, further causing the computer to:

delete an image arranged in the layout from the layout, wherein the image is deleted in a case where a degree of similarity between the model image and the image arranged in the layout is less than a predetermined threshold value.

13. An image processing method comprising:

a step of selecting, based on image feature value of each of a plurality of model images used in a model album and image feature value of each image in a candidate image group that is used in an album, similar images similar to the model images from among the candidate image group;

a step of creating a layout in which the similar images are arranged in templates of the model album;

a step of setting a priority order for each element configuring the layout in a case where a number of pages of an album to be created is smaller than a number of pages of the model album; and a step of reducing a number of pages of the layout in accordance with the priority order.

14. An image processing method comprising:

a step of setting a priority order for each element configuring a model album in a case where a number of pages of an album to be created is smaller than a number of pages of the model album;

a step of reducing the number of pages of the model album in accordance with the priority order, a step of selecting, based on image feature value of each of a plurality of model images used in the model album whose number of pages has been reduced and image feature value of each image of a candidate image group that is used in an album, similar images similar to the model images from among the candidate image group; and a step of creating a layout in which the selected similar images are arranged in templates of the model album whose number of pages has been reduced.

15. An image processing apparatus comprising: a processor; and a memory, with instructions stored thereon, which when executed by the processor cause the image processing apparatus to:

select, based on image feature value of each of a plurality of model images used in a model album and image feature value of each image in a candidate image group that is used in an album, similar images similar to the model images from among the candidate image group;

create a layout in which the similar images selected are arranged in templates of the model album;

set a priority order for each element configuring the layout in a case where a number of pages of an album to be created is smaller than a number of pages of the model album; and reduce a number of pages of the layout in accordance with the priority order.

16. An image processing apparatus comprising:

a setting unit configured to set a priority order for each element configuring a model album in a case where a number of pages of an album to be created is smaller than a number of pages of the model album;

a reducing unit configured to reduce the number of pages of the model album in accordance with the priority order;

a selection unit configured to select, based on image feature value of each of a plurality of model images used in the model album whose number of pages has been reduced by the reducing unit and image feature value of each image of a candidate image group that is used in an album, similar images similar to the model images from among the candidate image group; and a creation unit configured to create a layout in which the similar images selected by the selection unit are arranged in templates of the model album whose number of pages has been reduced by the reducing unit.

* * * * *